United States Patent [19]

Handsman

[11] 4,095,893
[45] Jun. 20, 1978

[54] ADJUSTABLE ENLARGING EASEL

[75] Inventor: Frederic B. Handsman, Bayside, N.Y.

[73] Assignee: Ehrenreich Photo-Optical Industries, Inc., Woodbury, N.Y.

[21] Appl. No.: 731,944

[22] Filed: Oct. 13, 1976

[51] Int. Cl.² .......................................... G03B 27/58
[52] U.S. Cl. ............................................... 355/74
[58] Field of Search ................ 355/60, 62, 63, 68–71, 355/54, 75, 125, 131, 122, 123, 72, 74; 85/DIG. 3; 40/156, 158 B

[56] References Cited

U.S. PATENT DOCUMENTS

| 1,389,587 | 9/1921 | Hilborn | 40/156 UX |
| 1,452,996 | 4/1923 | Baker | 355/72 |
| 1,818,528 | 8/1931 | Bern | 355/72 |
| 1,929,816 | 10/1933 | Hanson | 355/125 |
| 2,633,058 | 3/1953 | De Brouwer | 355/72 |
| 2,702,944 | 3/1955 | Lane et al. | 355/74 X |
| 2,803,164 | 8/1957 | Lehv | 355/72 |

Primary Examiner—Donald A. Griffin
Attorney, Agent, or Firm—Roy C. Hopgood; John M. Calimafde; Charles W. Neill

[57] ABSTRACT

This easel for photographic enlarging has retainers for holding paper in position on the easel, and improved means for adjusting the retainers for paper sheets of different size. There are clamps for holding the retainers in set positions and provision for preventing parts of the clamps from becoming disconnected when turned in directions to release them. A single clamping screw for each retainer expedites adjustment. Masks for paper of different size have the same spacing of screw-receiving openings corresponding to a single standardized spacing of threaded openings in the easel plate.

7 Claims, 7 Drawing Figures

ADJUSTABLE ENLARGING EASEL

BACKGROUND AND SUMMARY OF THE INVENTION

Easels are used for holding photographic paper in position when making enlargements. The paper is held by retainers which are constructed so that they do not shut off the light from any portion of the paper and thus make it possible to make enlargements with no border around the edges of the paper. Some easels have masks which cover the edges of the paper so that prints with borders can be made, if desired.

For professional use, the easels must be of rugged construction and made in such a way that the paper can be positioned and removed quickly and conveniently. It is also advantageous to have easels adjustable so that they can be used with photographic paper of different size, depending upon the size of the enlargement to be made.

This invention provides an easel having a wide range of adjustments with a minimum of manipulative steps. It has clamping adjustments for paper retainers which are made in such a way that the clamps cannot become disassembled if turned further than necessary in a direction to release them. The retainers can be adjusted with a single manually-operated knob for each retainer.

The construction provides for prints with no borders or prints which are masked to provide borders; and different sizes of masks for different size paper can be selectively connected with the easel with standardized fastenings for all sizes of masks.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
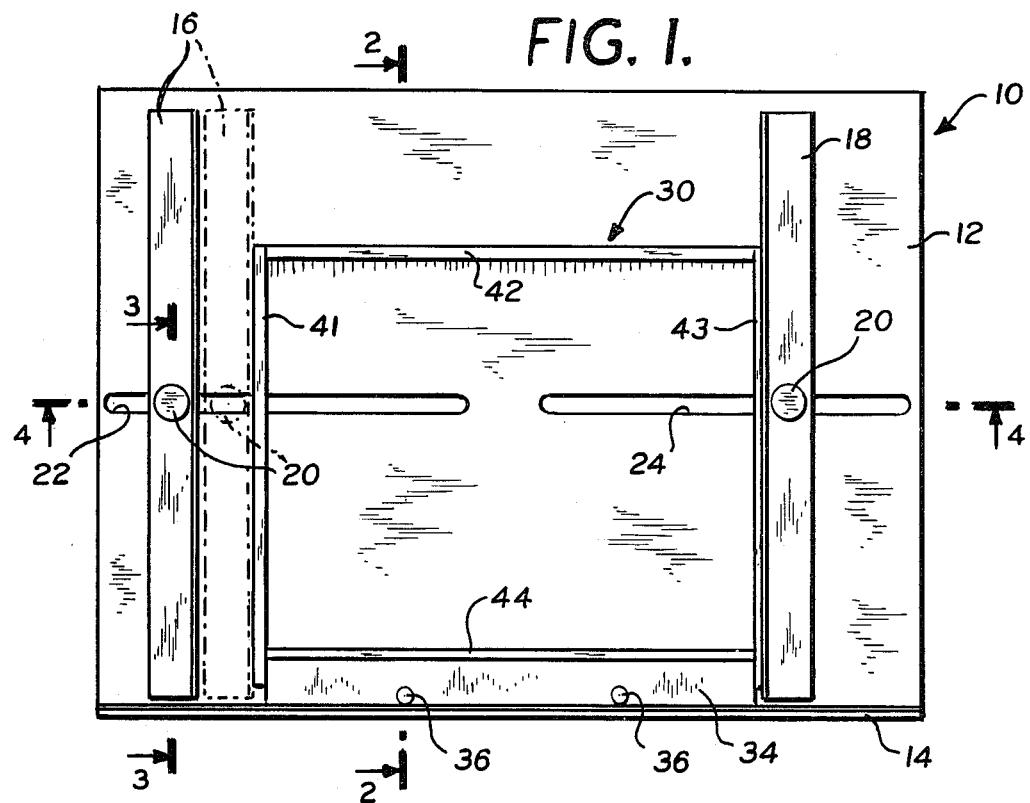
FIG. 1 is a top plan view of an adjustable easel made in accordance with this invention.

An easel 10 is made with a flat plate 12 having a flange 14 bent upwardly at one end. There are retainers 16 and 18 on top of the plate 12 for holding a piece of photographic paper in position on the easel. When in use, these retainers 16 and 18 are in position with their length extending normal to the flange 14. The retainers 16 and 18 have knobs 29 which can be rotated to operate clamping means, which will be described, to hold the retainers with the space between them equal to the width of the photographic paper on which a print is to be made.

Figure 4:
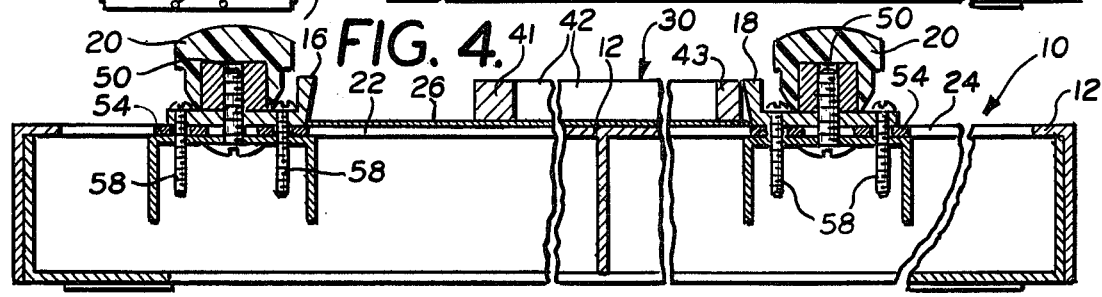
FIG. 4 is a fragmentary view taken on the line 4—4 of FIG. 1.

The clamps which are operated by the knobs 20 extend through slots 22 and 24 formed in the plate 12. FIG. 4 shows a sheet of paper 26 located between the retainers 16 and 18, the thickness of the paper being exaggerated for clearer illustration. The confronting faces of the retainers 16 and 18 diverge from one another as they extend downward. This enables the projected light to strike the paper across the full width of the paper when a print is to be made without any border. This is a conventional construction. A mask 30, shown in FIG. 1, is omitted in FIG. 4 in order to illustrate the operation when no border is to be made around the edges of the paper. When using the construction of FIG. 1 without the mask 30, a sheet of paper is advanced between the retainers 16 and 18 (the retainer 16 being in its dotted line position) and moved downward in FIG. 1 until edge of the paper is stopped by the flange 14. The paper is then in position for exposure, the easel being properly positioned with respect to the lens from which the projection comes to the paper.

The slots 24 extend generally parallel to the flange 14, and the clamping means for the retainers 16 and 18 can be released whenever the distance between the retainers is to be adjusted for paper of a different size. FIG. 1 shows the retainer 16 in a solid line position and a dotted line position to illustrate the way in which it moves over the surface of the plate 12.

When a print is to be made with a border around the edge, the mask 30 has a fixed portion 34 which is moved into position against flange 14, and this fixed portion 34 is secured to the plate 12 by screws 36 with extend through the mask and which screw into threaded openings 38 in the plate 12.

The mask 30 has an open frame which four sides, designated in FIG. 1 by the reference characters 41, 42, 43, and 44. These sides of the frame are of equal width, and the outside dimension of the mask is preferably equal to the size of the paper which is being exposed to make the enlargement. By having all of the sides 41–44 of equal width, a border of uniform width is formed around the print.

Figure 2:
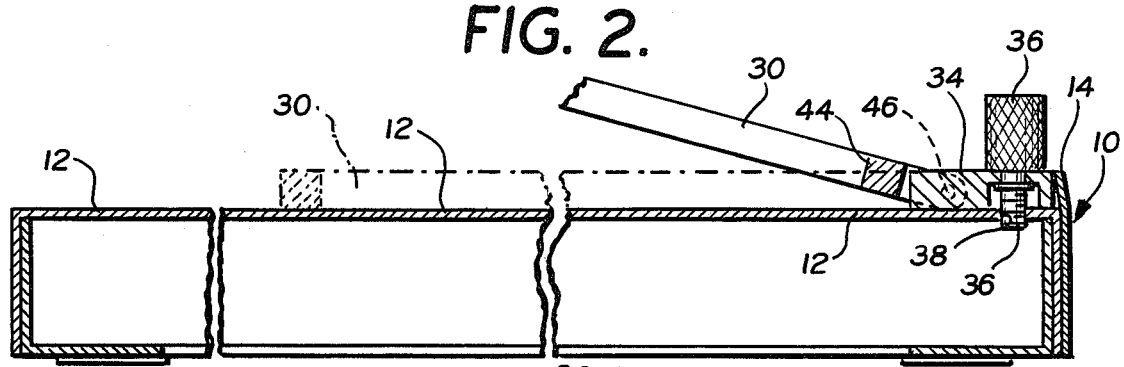
FIG. 2 is a sectional view taken on the line 2—2 of FIG. 1, the mask being shown in raised position.

The sides 41 and 43 of the mask extend somewhat beyond the side 44, as shown in FIG. 2, and they are hinged to the fixed portion 34 of the mask by pivot pins 46 which extend through the rearward end portions of the sides 41 and 43 and into the fixed portion 34 of the mask. Thus the mask 30 is free to swing upward, as shown in FIG. 2, to permit paper to be inserted into contact with the front surface of the fixed portion 34 of the mask.

When swung downward, as indicated in broken lines in FIG. 2, the mask 30 holds the paper in contact with the top surface of the plate 12. The paper is positioned on both sides by the retainers 16 and 18 (FIG. 1), as already described, when used without the mask.

The knobs 20 are at the upper end of screws 50 which have shoulders 52 that bear against the top surface of the retainers 16 and 18, the construction for the right-hand screw 52 being shown in detail in FIG. 4. After passing through the retainer 18 and the plate 12, the screw 50 threads into a lower clamping element 54 which is drawn up tight against the underside of the plate 12 when the knob 20 is rotated in a direction to pull the clamping element upward as a result of the threaded connection of the screw 50 with the clamping element 54.

No matter how far the knob 20 is turned, to loosen the clamping element 54, it is not possible for the clamping element to drop off the threads of the screw 50. There are connectors 58 connected between the retainer 18 and the clamping element 54 which limit the extent to which the clamping element 54 can move downward with respect to the retainer 18.

Referring again to FIG. 1, the retainers 16 and 18 have angular movement, when not clamped, about the axes of the knobs 20, but the retainers 16 and 18 are dimensioned so that angular movement does not cause them to strike against the flange 14. When in use, the retainers 16 and 18 must be at right angles to the flange 14 in order to contact with the edges of the paper most effectively. Use of a single clamping knob 20, for each of the retainers, facilitates locking them in clamped position. When a mask is attached to the plate 12, the retainers 16 and 18 can be positioned by bringing them into contact with the opposite sides of the mask. When no mask is to be used, they can be positioned quickly by bringing them into contact with a right triangle placed against the flange 14.

Figures 3, 5:
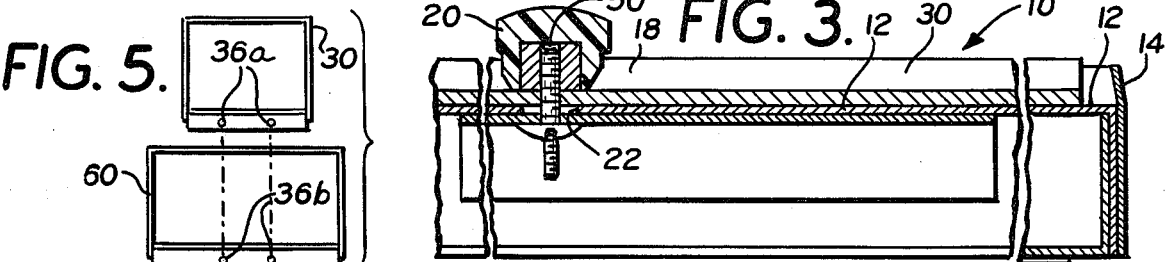
FIG. 3 is a fragmentary sectional view taken on the line 3—3 of FIG. 1.
FIG. 5 shows two masks of different size and illustrates the uniform connections for securing the different size masks to the easel.

FIG. 5 shows the mask 30 with openings 36'a for receiving the screws 36. FIG. 5 also shows a larger mask 60 for use with larger paper. The mask 60 has openings 36b which are at the same spacing from one another as the openings 36a. This makes it possible for the masks of different size to be connected with the plate 12 (FIG. 1) without having more than two threaded openings for the screws 36.

The preferred embodiment of the invention has been illustrated and described, but changes and modifications can be made and some features can be used in different combinations without departing from the invention as defined in the claims.

What is claimed is:

1. An adjustable enlarging easel including in combination a plate for holding a sheet of photographic paper that is to be exposed, a flange extending upward along one side of the plate, retainers supported by the top surface of the plate and extending generally normal to the flange, two slots opening through the plate and which extend from a mid-portion of the plate toward opposite edges thereof, a clamping element located on the underside of the plate under each retainer and permanently connected loosely to its associated retainer, and a connector extending from each of the retainers to its respective clamping element and operable to pull the clamping element into contact with the underside of the plate to clamp the retainer in a fixed position for holding a sheet of photographic paper at a predetermined location on the easel, the connector for each retainer being a screw with a knob head at its upper end and a shoulder on the underside of the knob head in position to contact with the retainer, said screw extending through the slot and retainer and being connected to the clamping element below the plate for pulling the clamping element toward the underside of the plate to clamp the retainer in any set position on the plate when said knob head is rotated on said screw.

2. The easel described in claim 1 characterized by the retainers having faces that confront one another across the surface of the plate on which the photographic paper is located when the easel is in use, and said faces diverging from one another as they extend downwardly for holding the paper without masking the edges of paper from the light which is projected on the paper to make a print.

3. The easel described in claim 1 characterized by a mask for paper of a predetermined size and that fits between the retainers when they are spaced from one another by the width of the paper.

4. The easel described in claim 3 characterized by the mask having a face that contacts with the flange to position the mask in one direction on the plate, and the mask having opposite side faces that are at right angles to the face that contacts with the flange, the mask being constructed and arranged to move upward away from the top surface of the plate to facilitate the placing of the paper between the retainers.

5. The easel described in claim 4 characterized by the mask having a fixed portion that fits against the flange and the remainder of the mask being angularly movable with respect to the fixed portion, hinge connections joining the movable portion to the fixed portion, the hinge connections being located in position with their pivot axes extending parallel to the adjacent face of the flange, and above the top surface of the plate by a distance that provides clearance of the hinged end of the mask to move about the axis of the hinge connection without striking the flange or the plate as the mask swings away from the plate for admitting a new sheet of photographic paper on the easel, two clamping screws that extend through the fixed portion of the mask and that thread into threaded openings in the plate, there being only two threaded openings, and masks of other sizes with the same distance between their openings for receiving the clamping screws.

6. An adjustable enlarging easel including in combination a plate for holding a sheet of photographic paper that is to be exposed, a flange extending upward along one side of the plate, retainers supported by the top surface of the plate and extending generally normal to the flange, two slots opening through the plate and which extend from a mid-portion of the plate toward opposite edges thereof, a clamping element located on the underside of the plate under each retainer and permanently connected loosely to its associated retainer, and a connector extending from each of the retainers to its respective clamping element and operable to pull the clamping element into contact with the underside of the plate to clamp the retainer in a fixed position for holding a sheet of photographic paper at a predetermined location on the easel, characterized by the connector for each retainer being a screw with a knob head at its upper end and a shoulder on the underside of the head in position to contact with the retainer, said screw extending through the slot and being threaded into the clamping element below the plate for pulling the clamping element toward the underside of the plate to clamp the retainer in any set position on the plate, characterized by there being only one slot through the plate for each retainer, each retainer being held by a single screw that slides along one of the slots in the plate, when not clamped, and retainer being movable, in a plane parallel to the top surface of the plate, about the screw as a center.

7. The easel described in claim 6 characterized by each retainer terminating some distance from the flange for all angular positions of the retainer about the screw that holds it on the easel.

* * * * *